United States Patent [19]
Patel et al.

[11] Patent Number: 5,008,797
[45] Date of Patent: Apr. 16, 1991

[54] POWER CONVERTER UTILIZING LINE REPLACEABLE UNITS

[75] Inventors: Sunil Patel; Robert Ligon; P. John Dhyanchand, all of Rockford, Ill.

[73] Assignee: Sundstrand Corporation, Rockford, Ill.

[21] Appl. No.: 453,974

[22] Filed: Dec. 20, 1989

[51] Int. Cl.[5] .............................................. H02M 1/14
[52] U.S. Cl. ...................................... 363/43; 363/37; 363/65
[58] Field of Search ..................... 363/34, 37, 71, 72, 363/144, 145, 146, 43, 65

[56] References Cited

U.S. PATENT DOCUMENTS

| | | | |
|---|---|---|---|
| 3,614,589 | 10/1971 | Ireland | 363/43 |
| 3,768,000 | 10/1973 | Bates | 363/43 |
| 3,775,662 | 11/1973 | Compoly et al. | |
| 4,159,513 | 6/1979 | Gemp et al. | 363/43 |
| 4,161,771 | 7/1979 | Bates | 363/43 |
| 4,533,987 | 8/1985 | Tomofuji et al. | 363/72 |
| 4,772,999 | 9/1988 | Fiorina et al. | 363/144 |
| 4,783,728 | 11/1988 | Hoffman | 363/37 |
| 4,886,961 | 12/1989 | Lentini et al. | 363/72 |

OTHER PUBLICATIONS

Article Entitled "Which DC/AC Inverter?" Appearing in Electronic Design, Dec. 6, 1974, by George A. O'Sullivan.

Primary Examiner—Steven L. Stephan
Assistant Examiner—Jeffrey Sterrett
Attorney, Agent, or Firm—Marshall, O'Toole, Gerstein, Murray & Bicknell

[57] ABSTRACT

Prior power converters utilizing a plurality of switches operated by control circuitry include many components which are subject to failure. When such a failure occurs, it may prove difficult to isolate the problem and repair the power converter. In order to overcome this problem, a power converter is packaged as a plurality of identical line replaceable units each of which may be easily replaced in the event of a malfunction.

13 Claims, 9 Drawing Sheets

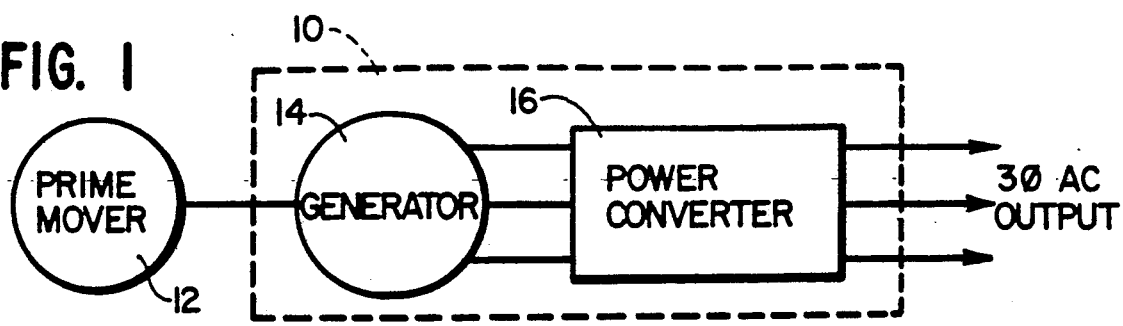
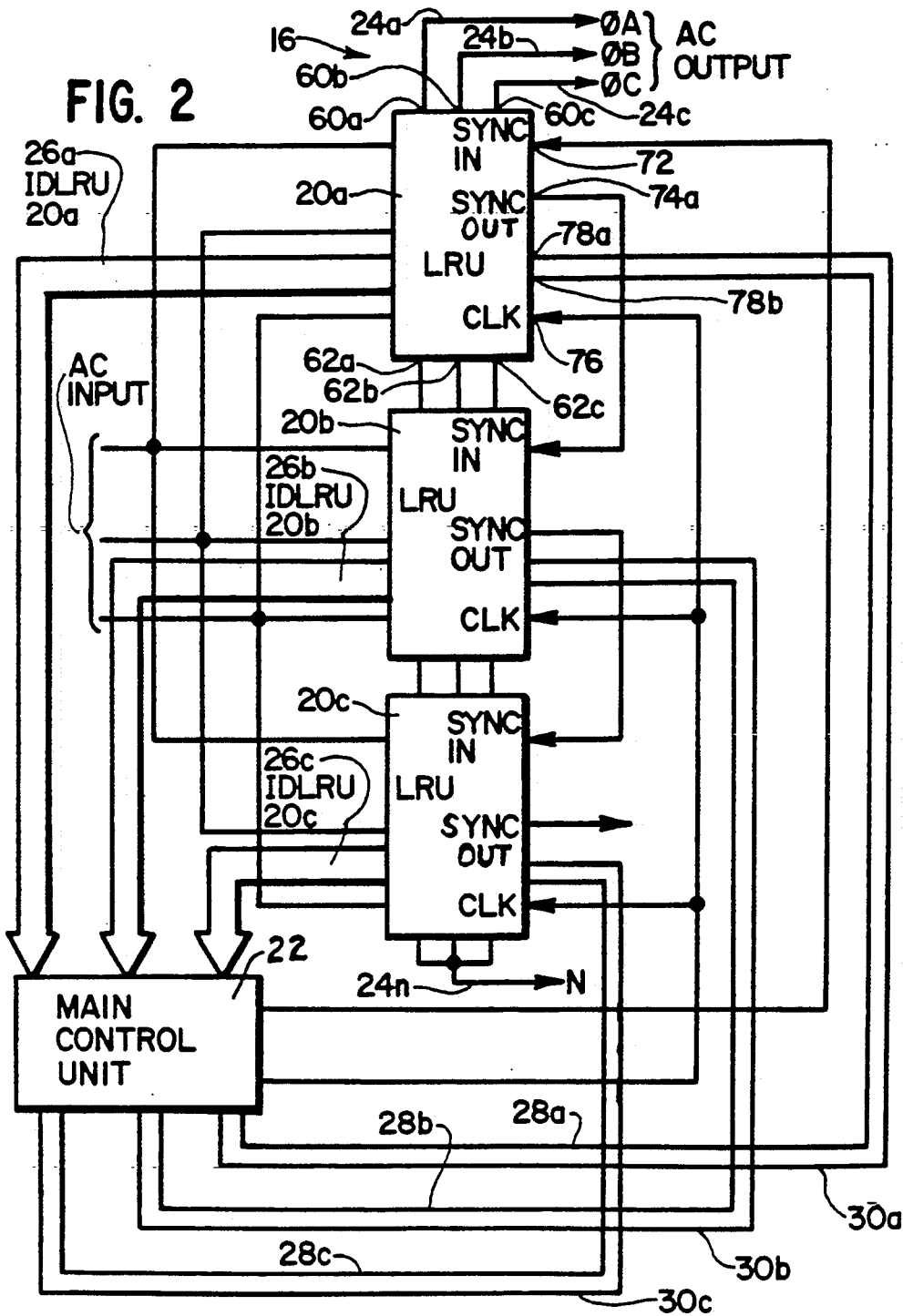

POWER CONVERTER UTILIZING LINE REPLACEABLE UNITS

TECHNICAL FIELD

The present invention relates generally to power converters, and more particularly to a power converter of modular construction utilizing line replaceable units.

BACKGROUND ART

There is a frequent need to convert variable-speed motive power produced by a prime mover, such as an aircraft jet engine, into constant-frequency AC power for one or more AC loads. Such a conversion can be effected by a variable-speed, constant-frequency (VSCF) power generating system which includes a brushless, synchronous generator coupled to the prime mover and a power converter coupled to the generator output windings which converts variable-frequency power produced by the generator into the constant-frequency power.

The power converter typically includes a rectifier which rectifies the variable-frequency power produced by the generator to produce DC power on a DC link and an inverter which converts the DC power into the constant-frequency AC power. The inverter may be of the stepped-waveform type in which a series of subinverters are coupled to a summing transformer that in turn produces a stepped AC waveform. Such an inverter produces an AC output having a harmonic content dependent upon the number of steps produced in each cycle of the output. Typically, the inverter includes either four or six 6-step inverters having outputs which are summed to produce 24-step or 36-step waveforms, respectively. Each 6-step subinverter includes six or a multiple of six power switches, and hence it can be seen that a relatively large number of power switches are utilized to produce the inverter output power. Such power switches or other components in the subinverters can occasionally fail, leading to an undesirable increase in harmonic content in the output or even rendering the entire inverter inoperative. In such a case, it is necessary to identify the failed switch or component by testing each until it is located and replacing same. This can be a time consuming process and can result in significant down time for the inverter.

SUMMARY OF THE INVENTION

In accordance with the present invention, a power converter includes a plurality of interconnected subconverters which are packaged as interchangeable line replaceable units (LRU's).

More particularly, an inverter includes a plurality of subinverters each including a plurality of power switches connected in a bridge-configuration between DC inputs and AC outputs, a summing transformer associated with each subinverter including a primary winding coupled to the AC outputs of the subinverter and a secondary winding having end terminals and means also associated with each subinverter for operating the plurality of power switches such that AC power is produced at the secondary winding end terminals. The subinverter and associated summing transformer and operating means are packaged as a line replaceable unit which includes terminals coupled to the DC inputs of the subinverter and the secondary winding end terminals. The secondary windings of the LRU's are connected in series and the subinverters are operated such that a stepped waveform is produced across the series-connected secondary windings.

In the event of a failure of one or more components in a line replaceable unit different line unit may be substituted therefor so that the faulty LRU may be repaired off-line. This facilitates repair and minimizes down time of the inverter.

BRIEF DESCRIPTION OF THE DRAWINGS

FIG. 1 is a block diagram of a power conversion system;

FIG. 2 is a block diagram of the power converter of FIG. 1 according to the present invention;

FIG. 3C is below FIG. 3B, is a combined simplified schematic and block diagram illustrating the LRU's of FIG. 2;

DESCRIPTION OF THE PREFERRED EMBODIMENT

Figure 3A:
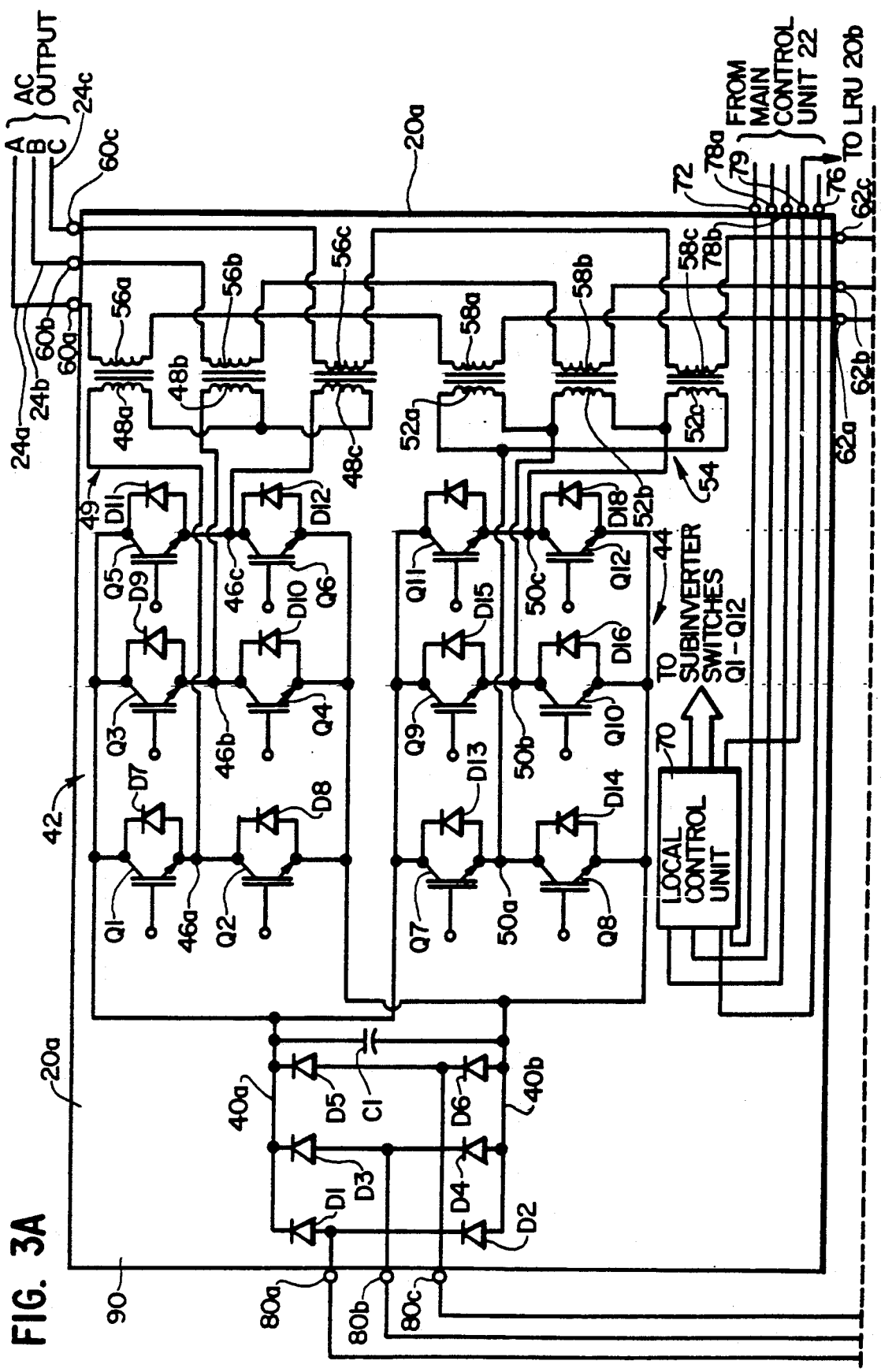
FIGS. 3A-3C, when joined along the dashed lines such that FIG. 3A is above FIG. 3B

Referring now to FIG. 1, a variable-speed, constant-frequency (VSCF) system 10 converts variable-speed motive power produced by a prime mover 12, such as an aircraft jet engine, into constant-frequency AC electrical power which may be supplied to one or more loads. The VSCF system 10 includes a brushless, synchronous generator 14 driven by the prime mover 12 and a power converter 16 which converts variable-frequency AC power produced by the generator 14 into constant-frequency AC power.

Referring now to FIG. 2, the power converter 16 includes three interconnected line replaceable units (LRU's) 20a-20c which receive control signals developed by a main control unit 22. Phase output voltages are developed on output lines 24a-24c coupled to the LRU 20a whereas a neutral output voltage is developed on an output line 24n coupled to the LRU 20c. Each LRU 20a-20c includes synchronization inputs and outputs as well as a clock input which receives clock signals developed by the main control unit 22. In a first embodiment of the invention, the synchronization input of the LRU 20a receives a synchronization signal developed by the main control unit 22. The synchronization output of the LRU 20a is coupled to the synchronization input of the LRU 20b while the synchronization output of the LRU 20b is coupled to the synchronization input of the LRU 20c.

Each LRU 20a-20c is coupled to the main control unit 22 by a connector 26a-26c, respectively, having a series of pins which identify each LRU 20a-20c to the main control unit 22. The main control unit develops a two-bit code for each LRU 20a-20c which comprises an access command signal and provides same over lines 28a-28c and 30a-30c. These signals, as noted in greater detail hereinafter, causes each LRU to develop an appropriate output waveform which is summed with outputs of the remaining LRU's to produce the constant-frequency AC output power.

Figure 3B:
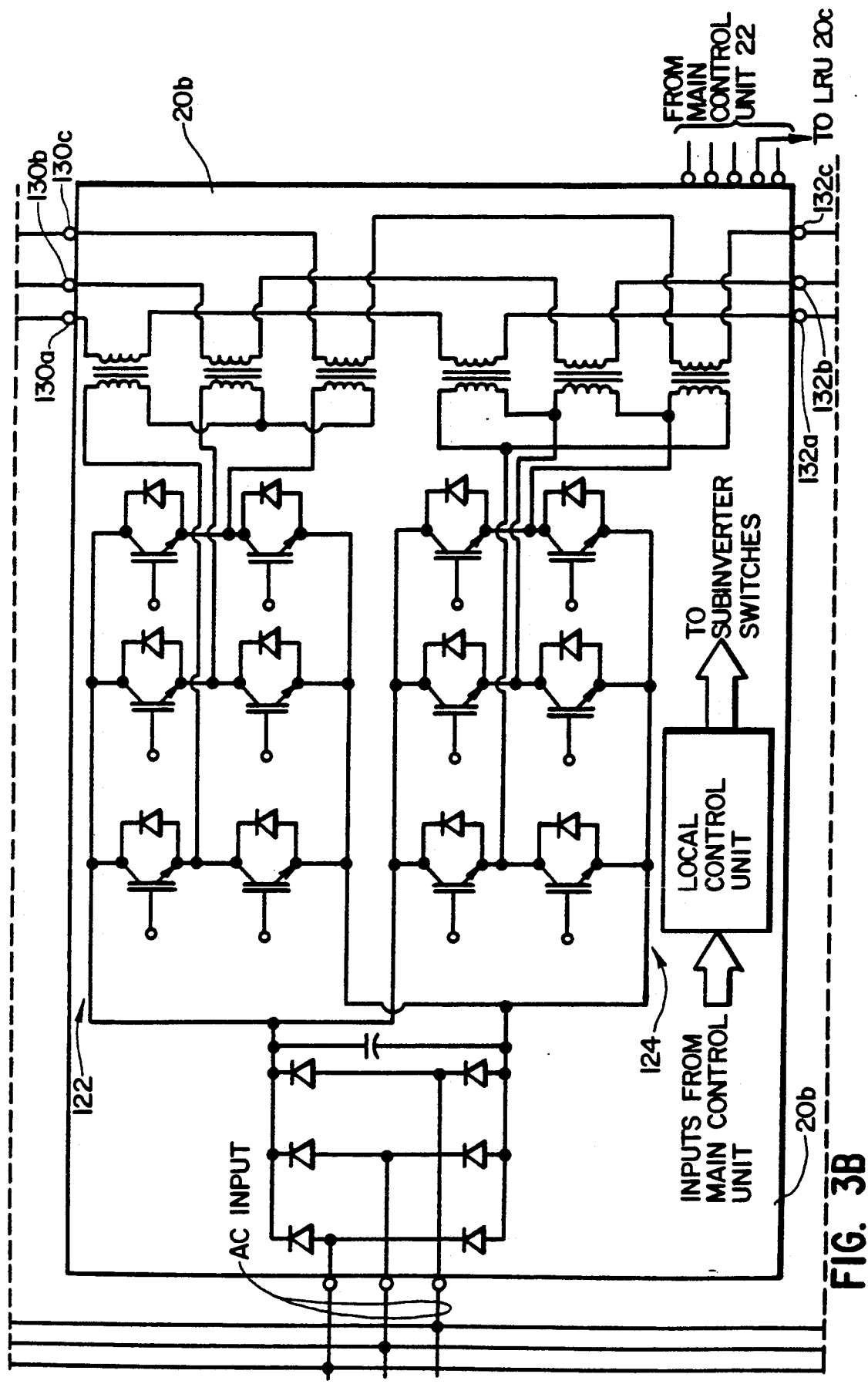
Figure 3C:
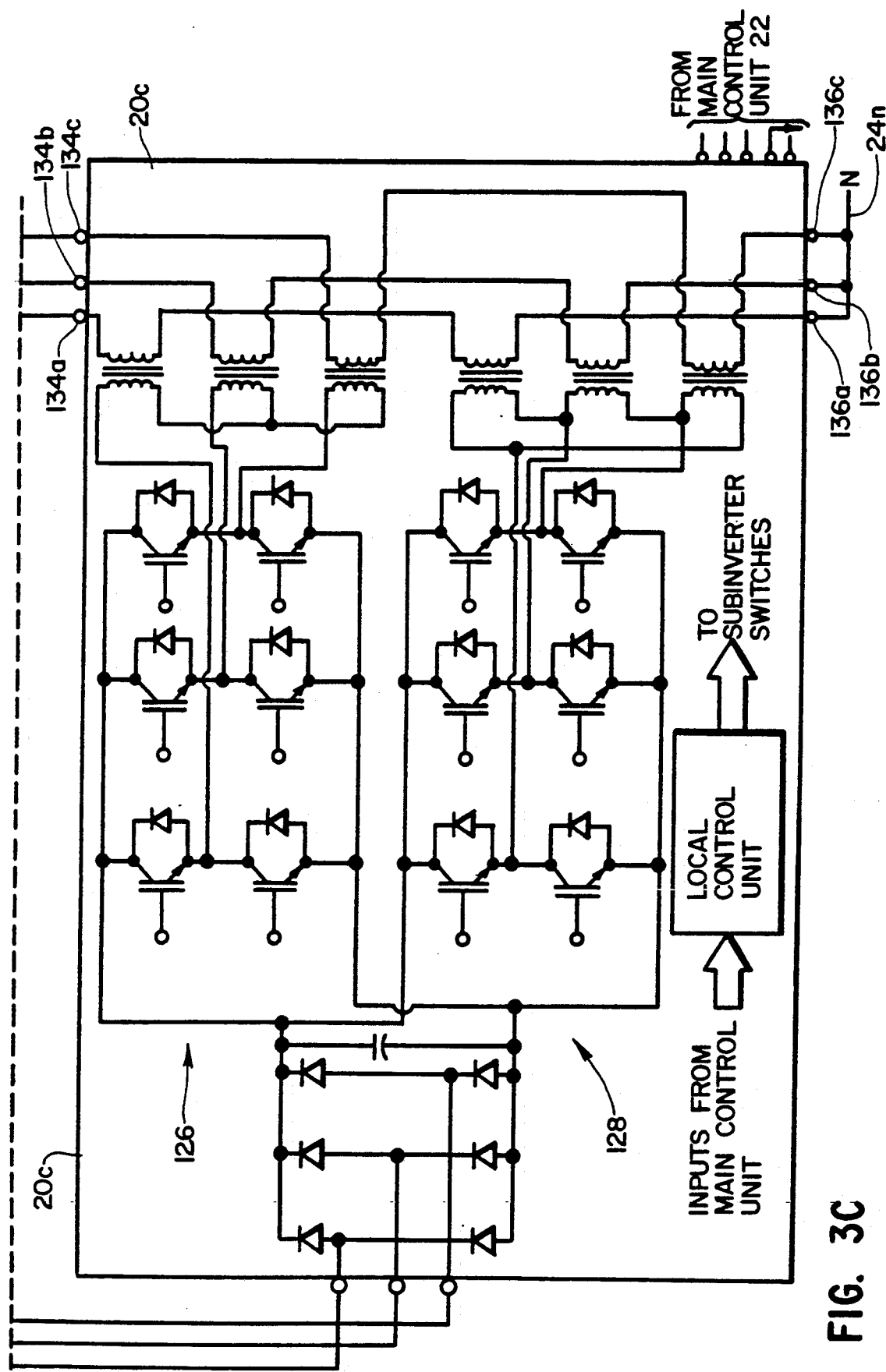

FIGS. 3A-3C illustrate the components contained within each LRU 20a-20c. Only the LRU 20a will be described in detail, it being understood that the LRU's 20b and 20c are identical thereto. Preferably, the LRU 20a includes a full bridge rectifier comprising diodes D1-D6 which convert AC input power into DC power on a DC link comprising DC conductors 40a-40b. A smoothing capacitor C1 is coupled across the DC conductors 40a, 40b to reduce ripple. The conductors 40a and 40b are coupled to first and second subinverters 42, 44. The inverter 42 includes power switches in the form of insulated gate bipolar transistors (IGBT's) Q1-Q6 together with associated flyback diodes D7-D12. In a like fashion, the subinverter 44 includes power switches Q7-Q12 in the form of IGBT's together with associated flyback diodes D13-D18. It should be noted that the subinverters 42, 44 may utilize different types of power switches, if desired.

Phase outputs 46a-46c of the subinverter 42 are coupled to a first set of primary windings 48a-48c, respectively, of a first summing transformer 49. Phase outputs 50a-50c of the subinverter 44 are coupled to a further set of three primary windings 52a-52c of a second summing transformer 54. The primary windings 48a-48c are connected together in a wye or star configuration whereas the primary windings 52a-52c are connected together in a delta configuration. The first summing transformer 49 includes a set of secondary windings 56a-56c and the second summing transformer 54 includes a set of secondary windings 58a-58c. The windings 56a and 58a are connected together in series as are the windings 56b and 58b and the windings 56c and 58c. The windings 56a-56c are coupled to the phase output lines 24a-24c at terminals 60a-60c while the secondary windings 58a-58c are coupled to terminals 62a-62c, respectively.

The switches Q1-Q12 are operated by a local control unit 70 which is responsive to the synchronization input signal, the clock signal and the access command signal. These signals are coupled to the local control unit 70 via terminals 72, 76 and 78a, 78b. Further, the synchronization output signal is provided to a terminal 79 by the control unit 70.

In addition to the foregoing, terminals 80a-80c are coupled to AC inputs of the rectifier comprising the diodes D1-D6.

The subinverters 42, 44, summing transformers 49, 54 and the local control unit 70 are packaged as a unit either within a housing or on a single circuit board 90. The terminals 60a-60c, 62a-62c, 72, 76, 78a, 78b, 79 and 80a-80c are located so that they are accessible from outside the housing or so that they are readily accessible on the circuit board. The housing or board 90 facilitates replacement of the LRU in the event that a component therein malfunctions.

As noted above, the rectifier bridge comprising the diodes D1-D6 is preferably a part of the LRU 20a. Alternatively, this rectifier bridge and the corresponding rectifier bridges in the LRU's 20b and 20c may be replaced by a single rectifier bridge outside of the LRU's 20a-20c and DC power may be provided to the subinverters of the LRU's 20a-20c through terminals accessible from outside each housing or circuit board 90.

Figure 4:
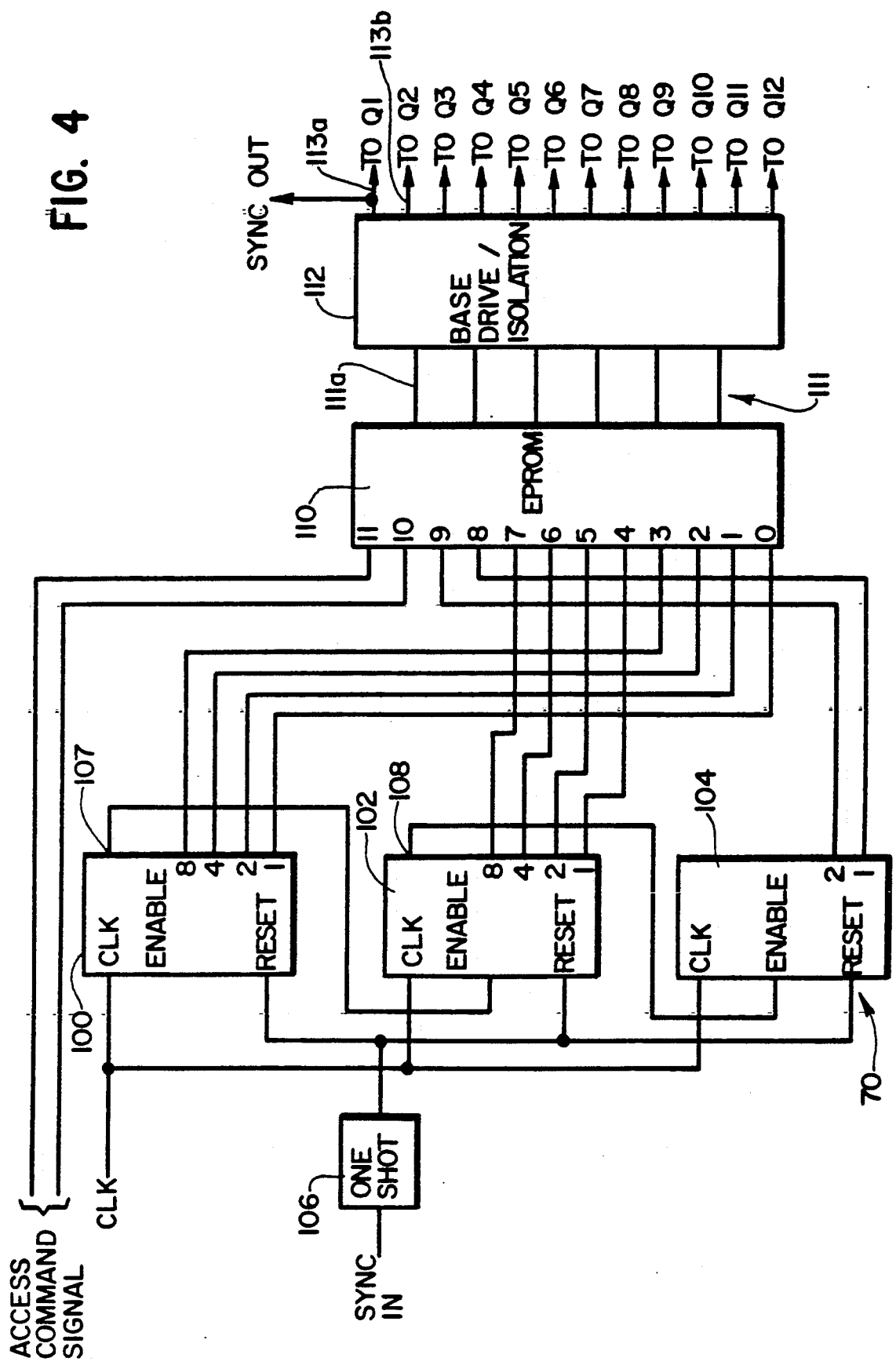
FIG. 4 comprises a block diagram of the local control unit of FIG. 2.

Referring now to FIG. 4, the local control unit 70 includes three four-bit counters 100, 102 and 104, each of which includes a clock input that receives the clock signal developed by the main control unit 22. Each counter 100-104 includes a reset input which receives a pulse produced by a one-shot 106. In the preferred embodiment, the one-shot 106 develops a negative-going pulse upon receipt of a positive-going edge in the synchronization input signal, although the one-shot 106 could alternatively produce a positive-going pulse if a different type of counter were used. In the case of the LRU 20a, FIG. 3A, the synchronization input signal is provided by the main control unit 22. In the case of the LRU's 20b, 20c, the synchronization input signal is provided by the preceding LRU 20a, 20b, respectively.

Ripple carry outputs 107, 108 of the counters 100, 102 are coupled to enable inputs of the counters 102, 104, respectively. The counters 100, 102 and 104 are thus connected to form a twelve-bit counter.

The counters 100-104 further include counter outputs which are coupled to low-order address inputs of a memory 110. All of the four-bit outputs of the counters 100, 102 are coupled to the inputs of the memory 110 as are the two lower order outputs of the counter 104. The memory 110 may be of any suitable type, such as an EPROM. Two high-order address inputs receive the access command signal provided by the main control unit 22.

In the preferred embodiment, the memory 110 includes four kilobytes of storage wherein the memory is subdivided into four one-kilobyte blocks. One of the blocks is accessed to control the subinverters 42, 44, a second block is accesssed to control the subinverters of the LRU 20b and a third block is accessed to control the subinverters of the LRU 20c. The particular block which is accessed by the counters 100, 102 and 104 is determined by the access command signal provided by the main control unit 22. The counters accumulate clock pulses and thus sequentially access memory locations in each block to produce a sequence of digital words and six of the eight retrieved bits of each word are provided over a series of lines 111 to a base drive and isolation circuit 112 which in turn develops isolated base drive signals of appropriate level for the subinverter switches of the appropriate LRU 20a, 20b or 20c. The base drive/isolation circuit thus obtains a series of six bit streams from the memory 110 wherein each bit stream controls one leg of one of the inverters 42 or 44. For example, the bit stream on a line 111a is used to control the switches Q1 and Q2 of the subinverter 42. When the state of the signal on the line 111a is high, the base drive/isolation circuit 112 develops a high state base drive signal for the switch Q1 on a line 113a and a low state drive signal for the switch Q2 on a line 113b. Conversely, when the state of the signal on the line 111a is low, the state of the base drive signal 113a is low and the state of the base drive signal on the line 113b is high. The base drive/isolation circuit 112 also provides a degree of immunity against simultaneous conduction of both switches of an inverter leg by providing a short dwell interval between turn-off of one transistor and turn-on of the other transistor of the leg.

The design of the base drive/isolation circuit is straightforward in nature and may, in fact, be implemented by a conventional circuit, and hence will not be described in greater detail herein.

The synchronization output signal developed by the LRU 20a is obtained from the signal produced on the line 113a. The synchronization output signal may instead by derived from a different output, such as the signal on the line 113b, or the unused outputs of the memory, if desired.

Figure 7:
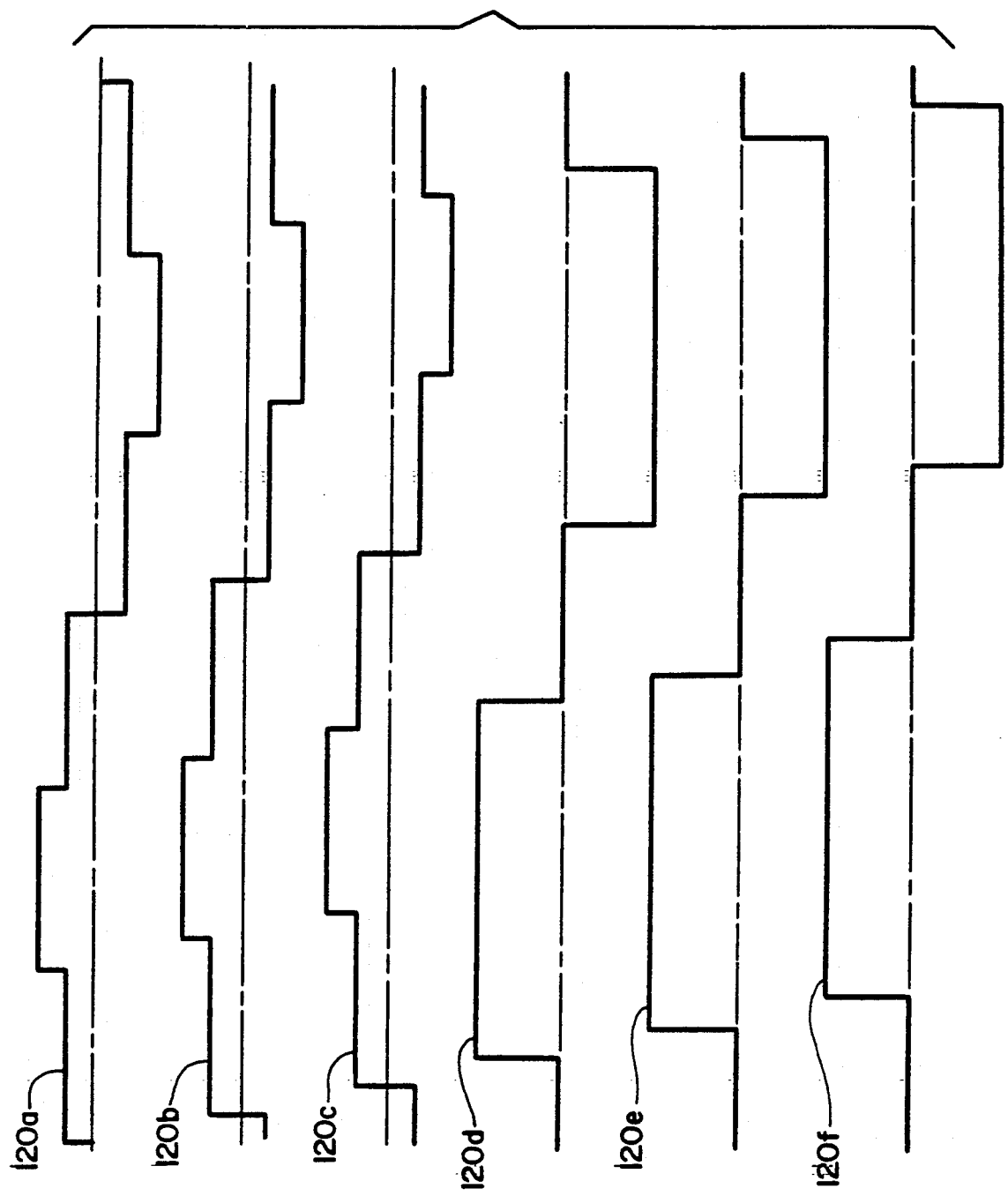
FIG. 7 comprises a series of waveform diagrams illustrating a single phase produced by each subinverter of each LRU.
Figure 8:
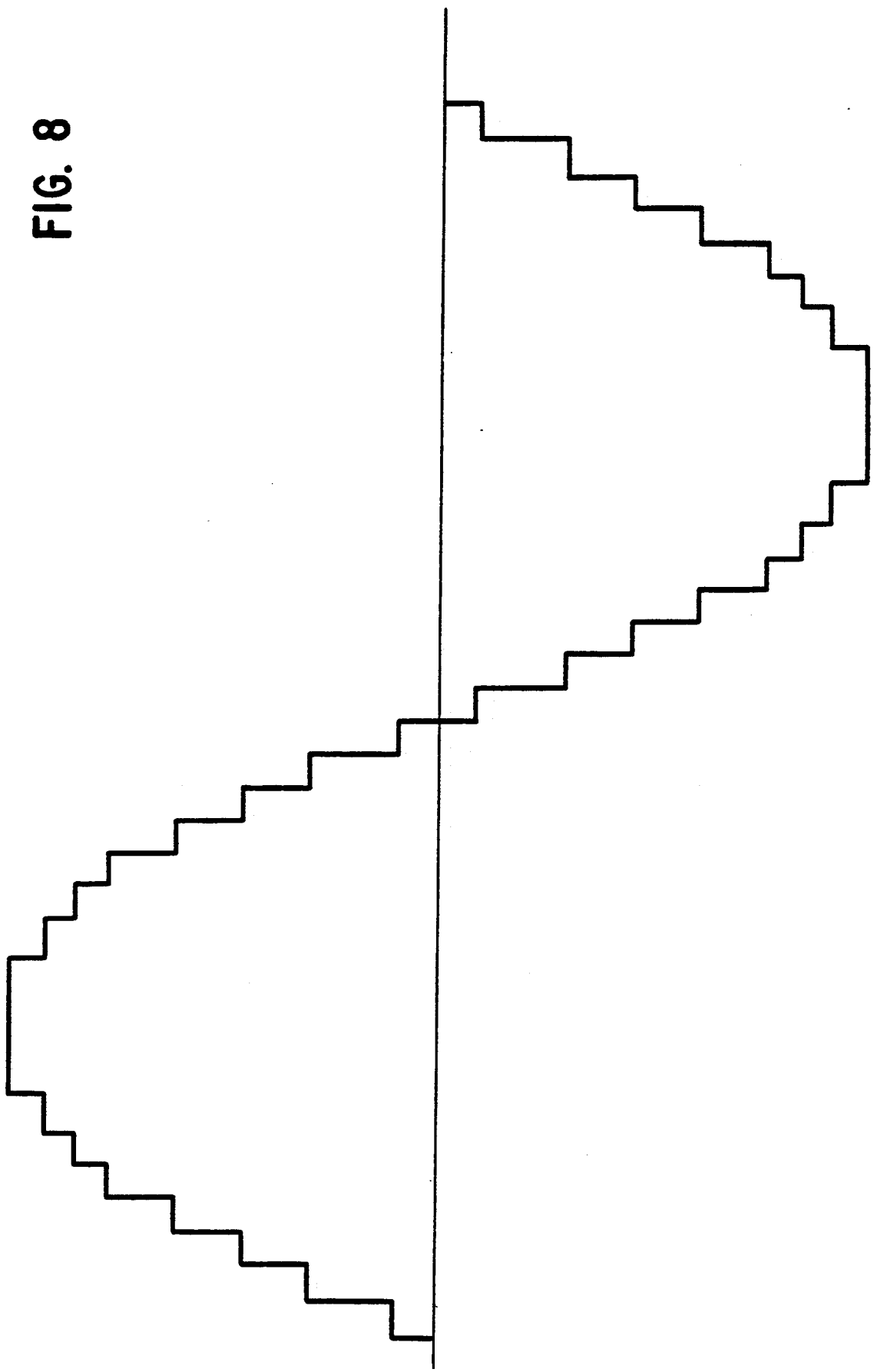
FIG. 8 comprises a waveform diagram illustrating one phase of the AC output of the power converter of FIG. 1.

FIG. 7 illustrates one phase (for example phase A) produced by the subinverters of the LRU's 20a-20c while FIG. 8 shows one phase (i.e. phase A) of the resulting output waveform from the summing transformer 49. As seen in FIG. 7, the subinverters 42, 44 produce the stepped waveforms 120a, 120d, respectively. Stepped waveforms 120b-120e and 120c, 120f are produced by corresponding subinverters 122, 124 and 126, 128 in the LRU's 20b, 20c, respectively. Phase B and phase C waveforms are identical to those shown in FIGS. 7 and 8, except that they are displaced 120° and 240° relative thereto, respectively. The LRU's 20b, 20c include terminals 130a, 130c, 132a-132c and 134a-134c, 136a-136c corresponding to the terminals 60a-60c and 62a-62c, respectively. The terminals 62a-62c are connected to the terminals 130a-130c while the terminals 132a-132c and 134a-134c are interconnected. The secondary windings of the summing transformers in the LRU's 20a-20c are thus connected in series so that the phase A voltage waveforms 120a-120f of FIG. 7 and the phase B and phase C waveforms are summed to produce three-phase, 36-step waveforms.

It should be noted that the memories of the LRU's contain identical information such that each LRU can produce any of the waveforms 120a-120f illustrated in FIG. 7 and the corresponding phase B and phase C waveforms. The LRU identification signal determines which waveforms are produced by the LRU.

As should be evident from FIG. 7, the LRU's produce identical waveforms except that the waveforms produced by successive LRU's are displaced 10° with respect to their counterpart in other LRU's. That is, the waveforms produced by the subinverters of the LRU 20b are displaced 10° later in time with respect to the waveforms produced by the subinverters 42, 44 and the waveforms produced by the subinverters of the LRU 20c are displaced 10° later in time relative to the waveforms produced by the subinverters of the LRU 20b. This 10° phase shift is accomplished by loading the one kilobyte blocks of each memory with identical data except that the data are shifted in the memory storage locations of each block relative to the data of other blocks and by resetting the counters of the LRU's 20a-20c at substantially the same time. The latter is accomplished by the interconnection of synchronization outputs and inputs of successive LRU's as shown in FIG. 2. Any sequence errors which might arise are automatically corrected at the end of each cycle of the output.

In addition to the foregoing, the phase shift between successive LRU outputs may be controllably variable to afford voltage regulation. Changing the phase shift, however, results in a different harmonic content in the inverter output and hence it may be necessary to limit the range of variation to maintain harmonic content below a specified maximum. Circuitry for effectuating such a result is disclosed in Dhyanchand, et al., copending application Ser. No. 07/453,975, filed Dec. 20, 1989, entitled "Regulator for Stepped-Waveform Inverter", the disclosure of which is hereby incorporated by reference herein.

Figure 5:
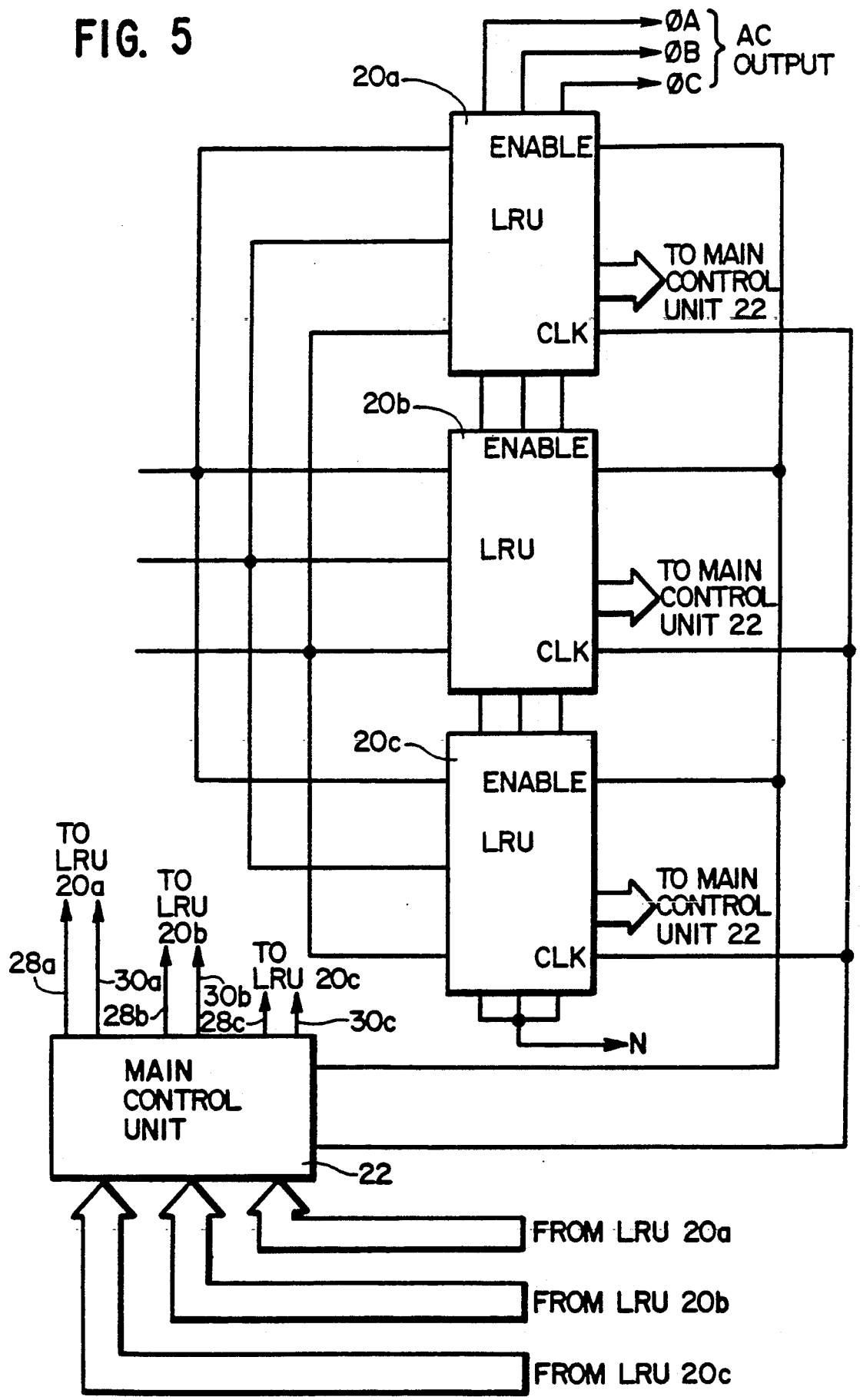
FIGS. 5 and 6 are block diagrams similar to FIG. 1 illustrating alternative power converters according to the present invention.
Figure 6:
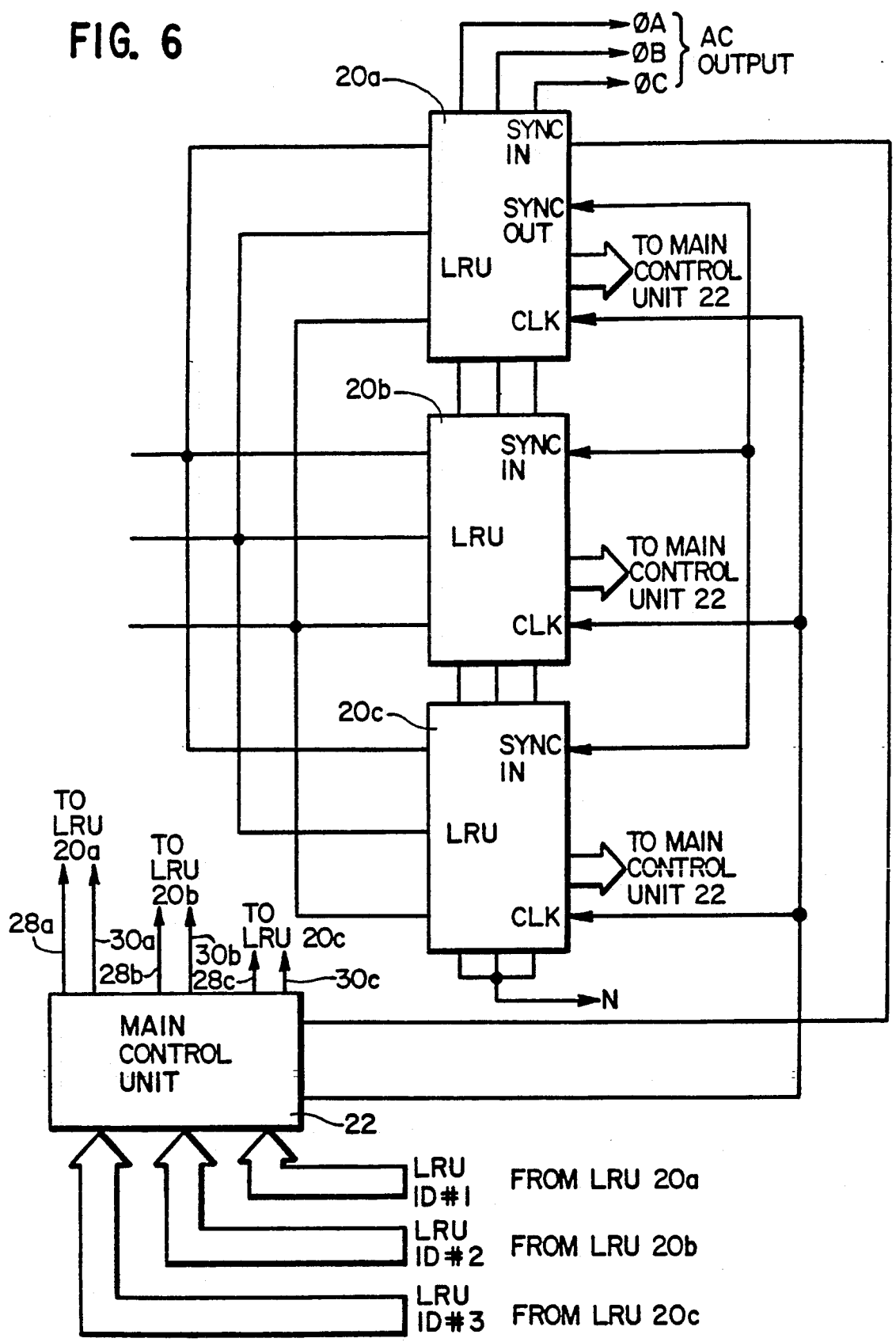

Alternatives to the synchronization scheme of FIG. 2 are illustrated in FIGS. 5 and 6. Elements common to FIGS. 2, 5 and 6 have been assigned like reference numerals. In FIG. 5, each LRU includes an enable input which is coupled to the enable input of the counter corresponding to the counter 100 of FIG. 4. Each enable input of the LRU's 20a-20c receives an enable signal developed by the main control unit 22. Upon generation of the enable signal, the LRU 20a-20c begin their sequence of sequentially providing digital words from the memory 110 in the fashion described above. Such a synchronization scheme is not as desirable as that illustrated in FIG. 2, inasmuch as sequence errors can only be corrected by disabling all three LRU's 20a-20c and re-enabling same. Thus, there is no automatic correction of sequence errors.

FIG. 6 illustrates a further alternative embodiment wherein the LRU 20a provides a synchronization output signal to the synchronization inputs of both of the LRU's 20b, 20c. In this case, the LRU 20b imposes a 10° phase delay with respect to the synchronization signal provided by the LRU 20a whereas the LRU 20c imposes a 20° phase delay with respect to the synchronization signal provided by the LRU 20a. These phase delays can be implemented by a delay element or circuit which delays the reset signal for the counter of the LRU the proper amount with respect to the synchronization input signal supplied thereto.

A power converter assembled using the LRU's disclosed herein is simple in design and can be easily repaired in the event of fault or other malfunction. If desired, the power converter may include a fourth spare LRU which can be substituted for a faulty LRU in the field so that down time of the counter is minimized.

We claim:

1. A modular line replaceable unit (LRU) connectable to and operable in conjunction with another substantially identical modular LRU to form a stepped-waveform inverter, comprising:
   a power switch;
   means coupled to the power switch for controlling same including a synchronization input which is responsive to a synchronization signal to synchronize the operation of the power switch to the other modular LRU when the modular LRU's are to be operated in conjunction with one another;
   a transformer having a primary winding coupled to the power switch and a secondary winding;
   means for packaging the power switch, the controlling means and the transformer as a unit; and
   terminals accessible from outside the unit connected to the power switch and the transformer secondary winding including a terminal connected to the synchronization input.

2. The LRU of claim 1, further including a rectifier packaged in the unit and coupled between the power switch and one of the terminals.

3. The LRU of claim 1, wherein the packaging means comprises a circuit board on which the power switch controlling means and transformer are disposed.

4. The LRU of claim 1, wherein the controlling means further includes an access command input responsive to an access command signal further including a terminal accessible from outside the unit connected to the access command input.

5. The LRU of claim 4, wherein the LRU includes a counter responsive to the synchronization signal which accumulates clock pulses and a memory coupled to the counter and responsive to the access command signal which produces a control signal for the power switch.

6. The LRU of claim 1, wherein the packaging means comprises a housing within which the power switch, controlling means and transformer are disposed.

7. A power converter comprising:
a plurality of line replaceable units (LRU's) each including
   A subinverter including a plurality of power switches connected in a bridge configuration between DC inputs and AC outputs,
   a transformer including a primary winding coupled to the AC outputs of the subinverter and a secondary winding having end terminals,
   means for controlling the plurality of power switches such that AC power is produced at the secondary winding end terminals and
   means for packaging the subinverter, transformer and controlling means as a unit including terminals coupled to the DC inputs of the inverter and the secondary winding end terminals;
means for connecting the secondary windings of the LRU's together in series such that a summed voltage is produced across the series-connected secondary windings; and
means for synchronizing the operation of the subinverters in the LRU's whereby the summed voltage comprises a stepped waveform.

8. The power converter of claim 7, wherein the packaging means comprises a circuit board on which the power switches, controlling means and transformer are disposed.

9. The power converter of claim 7, wherein each LRU includes a synchronization input and a synchronization output and wherein a synchronization output of one LRU is coupled to a synchronization input of another LRU.

10. The power converter of claim 9, wherein the power converter includes first, second and third LRU's and wherein the synchronization input of the first LRU receives a synchronization signal developed by the synchronizing means, the synchronization output of the first LRU is coupled to the synchronization input of the second LRU and the synchronization output of the second LRU is coupled to the synchronization input of the third LRU.

11. The power converter of claim 9, wherein the power converter includes first, second and third LRU's and wherein the synchronization input of the first LRU receives a synchronization signal developed by the synchronizing means and the synchronization output of the first LRU is coupled to the synchronization inputs of the second and third LRU's.

12. The power converter of claim 7 further including a rectifier bridge packaged in the unit and coupled to the power switches.

13. The power converter of claim 7, wherein the packaging means comprises a housing within which the power switches, transformer and controlling means are disposed.

* * * * *